US012773640B2

(12) United States Patent
Miao

(10) Patent No.: US 12,773,640 B2
(45) Date of Patent: Oct. 27, 2026

(54) METHOD AND APPARATUS FOR WATCHING GAME AFTER CHARACTER IS ELIMINATED, AND ELECTRONIC DEVICE AND STORAGE MEDIUM THEREOF

(71) Applicant: NETEASE (HANGZHOU) NETWORK CO., LTD., Hangzhou (CN)

(72) Inventor: Haoqi Miao, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 262 days.

(21) Appl. No.: 18/681,883

(22) PCT Filed: May 25, 2022

(86) PCT No.: PCT/CN2022/095022
§ 371 (c)(1),
(2) Date: Feb. 7, 2024

(87) PCT Pub. No.: WO2023/045375
PCT Pub. Date: Mar. 30, 2023

(65) Prior Publication Data

US 2025/0001315 A1 Jan. 2, 2025

(30) Foreign Application Priority Data

Sep. 24, 2021 (CN) .......................... 202111123137.2

(51) Int. Cl.
*A63F 13/86* (2014.01)

(52) U.S. Cl.
CPC .................................... *A63F 13/86* (2014.09)

(58) Field of Classification Search
CPC .. A63F 13/86; A63F 13/2145; A63F 13/5255; A63F 13/92; A63F 13/52;
(Continued)

(56) References Cited

U.S. PATENT DOCUMENTS

| | | | | |
|---|---|---|---|---|
| 10,946,292 | B1 | 3/2021 | George et al. | |
| 2012/0001944 | A1 * | 1/2012 | Sakurai ............... | G06F 3/04815 345/671 |

(Continued)

FOREIGN PATENT DOCUMENTS

| | | | |
|---|---|---|---|
| CN | 108920084 | A | 11/2018 |
| CN | 109331468 | A | 2/2019 |

(Continued)

OTHER PUBLICATIONS

Notice of Allowance dated Jul. 12, 2024 of Chinese Application No. 202111123137.2.

(Continued)

*Primary Examiner* — Michael A Cuff
(74) *Attorney, Agent, or Firm* — Qinghong Xu

(57) ABSTRACT

Disclosed are a method and apparatus for watching a game after a character is eliminated, and an electronic device and a storage medium. The method includes: displaying, in the graphical user interface of the terminal device, a game watching screen identical to a target game screen of a target virtual character being watched, after a virtual character corresponding to the terminal device is eliminated; adjusting the game watching screen in response to an adjustment operation on a viewing angle of the game watching screen; and restoring the game watching screen to be consistent with the target game screen of the target virtual character in response to a disappearance of the adjustment operation on the viewing angle.

20 Claims, 5 Drawing Sheets

(58) Field of Classification Search
CPC .............. A63F 13/5372; A63F 13/5378; A63F 13/837; A63F 13/847; A63F 2300/8076; A63F 2300/8082
USPC ........................................................... 463/31
See application file for complete search history.

(56) References Cited

U.S. PATENT DOCUMENTS

| | | | | |
|---|---|---|---|---|
| 2016/0175715 | A1 | 6/2016 | Ye et al. | |
| 2016/0263477 | A1 | 9/2016 | Ladd et al. | |
| 2017/0246544 | A1* | 8/2017 | Agarwal | A63F 13/63 |
| 2019/0126136 | A1* | 5/2019 | Minamino | A63F 13/98 |
| 2020/0197807 | A1* | 6/2020 | Tieger | A63F 13/86 |
| 2021/0268380 | A1* | 9/2021 | Yang | G06F 3/04815 |
| 2021/0286446 | A1 | 9/2021 | Wang | |

FOREIGN PATENT DOCUMENTS

| | | | |
|---|---|---|---|
| CN | 109876442 | A | 6/2019 |
| CN | 110624248 | A | 12/2019 |
| CN | 112619133 | A | 4/2021 |
| CN | 112807686 | A | 5/2021 |
| CN | 113069767 | A | 7/2021 |
| CN | 113827986 | A | 12/2021 |
| JP | 2012249881 | A | 12/2012 |
| JP | 2014073330 | A | 4/2014 |
| JP | 2016116826 | A | 6/2016 |
| JP | 2018191769 | A | 12/2018 |
| JP | 2020535879 | A | 12/2020 |
| JP | 2021112591 | A | 8/2021 |
| KR | 20160054152 | A | 5/2016 |

OTHER PUBLICATIONS

1st Office Action dated Sep. 10, 2024 of Japanese Application No. 2023-573468.

Softbank Creative Corp., Earth Defense Force: Insect Armageddon Masters Guide, 1st edition, published on Aug. 26, 2011, p. 59.

The most important conversation among 5 to 5 interview with SCARZ team leader Marin, https://esports-world.jp/interview/6376, published on Jul. 30, 2020.

Summary of PUBG Season 5 New Patch Information New Parking Items Debut and Vikendi Update, e-sports-press, https://e-sports-press.com/archives/21355, published on Nov. 14, 2019.

International Search Report dated Aug. 26, 2022 of International Application No. PCT/CN2022/095022.

1st Office Action dated Dec. 28, 2023 of Chinese Application No. 202111123137.2.

* cited by examiner

Point-marking mode

Line-marking mode

METHOD AND APPARATUS FOR WATCHING GAME AFTER CHARACTER IS ELIMINATED, AND ELECTRONIC DEVICE AND STORAGE MEDIUM THEREOF

CROSS REFERENCE TO RELATED APPLICATIONS

The present disclosure is the US National Phase Application of PCT Application No. PCT/CN2022/095022, filed on May 25, 2022, which is based upon and claims priority to the application document with an application number of 202111123137.2, filed on Sep. 24, 2021, and titled "Method and Apparatus for Spectating Game after Character is Eliminated, Electronic Device, and Storage Medium", the entire content of both of which is incorporated herein by reference for all purposes.

TECHNICAL FIELD

The present disclosure relates to the technical field of games, and in particular, to a method and apparatus for watching a game after a character is eliminated, an electronic device, and a computer-readable storage medium.

BACKGROUND

With the development of network technology, more and more games are applied to mobile terminals. In a multiplayer game, when the virtual character controlled by the user is eliminated, the user may choose to exit the current game and start the next game by himself/herself, or choose to continue to participate in the current game by watching the game.

SUMMARY

The present disclosure provides a method and apparatus for watching a game after a character is eliminated, an electronic device, and a computer-readable storage medium, where the present disclosure includes: a method for watching a game after a character is eliminated, where a graphical user interface is obtained by executing an application program on a processor of a terminal device and rendering on a touch display screen of the terminal device; and the method includes: displaying, in the graphical user interface of the terminal device, a game watching screen identical to a target game screen of a target virtual character being watched, after a virtual character corresponding to the terminal device is eliminated; adjusting the game watching screen in response to an adjustment operation on a viewing angle of the game watching screen; and restoring the game watching screen to be consistent with the target game screen of the target virtual character in response to a disappearance of the adjustment operation on the viewing angle.

An apparatus for watching a game after a character is eliminated is provided, where a graphical user interface is obtained by executing an application program on a processor of a terminal device and rendering on a touch display screen of the terminal device, and the apparatus includes: a game watching screen determining module, configured to display, in the graphical user interface of the terminal device, a game watching screen identical to a target game screen of a target virtual character being watched, after a virtual character corresponding to the terminal device is eliminated; a game watching screen adjusting module, configured to adjust the game watching screen in response to an adjustment operation on a viewing angle of the game watching screen; and a game watching screen synchronizing module, configured to restore the game watching screen to be consistent with the target game screen of the target virtual character in response to a disappearance of the adjustment operation on the viewing angle.

An electronic device includes: a processor, a memory, and a computer program stored on the memory and capable of running on the processor, where the computer program, when executed by the processor, implements the steps of the above method for watching a game after a character is eliminated.

A computer-readable storage medium is provided, where a computer program is stored on the computer-readable storage medium, and the computer program, when executed by a processor, implements the steps of the above method for watching a game after a character is eliminated.

BRIEF DESCRIPTION OF THE DRAWINGS

In order to illustrate the present disclosure more clearly, the accompanying drawings, which are to be used in the description of the present disclosure, will be briefly introduced below. Apparently, the drawings in the following description are only some embodiments of the present disclosure, and those skilled in the art may obtain other drawings according to these drawings without paying creative efforts.

DETAILED DESCRIPTION

In order to make the above objects, features and advantages of the present disclosure more obvious and comprehensible, the present disclosure is described in further detail below in conjunction with the accompanying drawings and specific embodiments. Obviously, the described embodiments are a part of the embodiments of the present disclosure, rather than all of the embodiments. Based on the embodiments in the present disclosure, all other embodiments obtained by a person of ordinary skill in the art without creative efforts fall within the scope of protection of the present disclosure.

In the game of team combat, when the user chooses to quit the current game, it is easy to affect the teammate's combat emotion. Especially, when the teammate is the real-life friend of the user, if the user exits the game in advance, it will also affect the discussion about the feelings of the current game with the friend. When the user chooses to continue to participate in the current game by watching the game, the user can only watch the game screen operated by the user being watched due to the existing game watching process, and the sense of participation is low. Especially when the user watches the teammate in battle, the existing manner of game watching can not provide strong help for the battle of the teammate being watched, and it is not friendly to the user whose character in the team has been eliminated, which affects the user's experience of watching the game.

Figure 1:
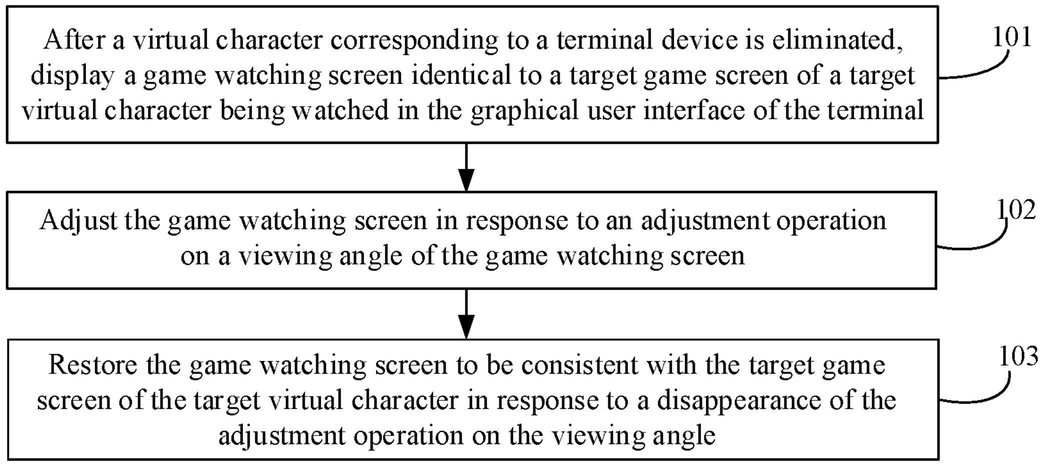
FIG. 1 is a flowchart of the steps of a method for watching a game after a character is eliminated in one of the embodiments of the present disclosure.

Referring to FIG. 1, a flowchart of a method for watching a game after a character is eliminated provided by an embodiment of the present disclosure is illustrated, where a graphical user interface is obtained by executing an application program on a processor of a terminal device and rendering on a touch display screen of the terminal device.

In the embodiments of the present disclosure, the application program executed on the processor of the terminal device may be an application program that needs to be downloaded and installed, or may be a click-to-run application program, which is not limited in the embodiments of the present disclosure. The terminal device may be an electronic device such as a smart phone, a tablet computer, a game console, an e-book reader, a multimedia playback device, and a wearable device.

In the embodiments of the present disclosure, the above application program may be any application program capable of providing a virtual environment for the virtual object substituted and operated by a user to perform activities in that virtual environment. Typically, the application program is a game application program, such as a Multiplayer Online Battle Arena (MOBA) game, a Battle Royale (BR) game, a Third-Personal Shooting (TPS) game, a First-Personal Shooting (FPS) game and a multiplayer gunfight survival game, etc. In addition to the game application program, the virtual object may also be presented to the user and the corresponding function may be provided to the virtual object in other types of application programs, such as a Virtual Reality (VR) type application program, an Augmented Reality (AR) type application program, a three-dimensional map application program, a military simulation application program, a social application program, etc., which are not limited in the embodiments of the present disclosure. In addition, for different application programs, the forms of the virtual objects provided therein may be different, and the corresponding functions may also be different, which may be configured in advance according to the actual needs, and the embodiments of the present disclosure are not limited thereto. Optionally, the terminal device runs the client of the above application program. In some embodiments, the aforementioned application program is an application program developed based on a three-dimensional virtual environment engine. For example, the virtual environment engine is a Unity engine, and the virtual environment engine is capable of constructing a three-dimensional virtual environment, a virtual object and a virtual prop, etc., so as to bring a more immersive gaming experience to the user.

The aforementioned virtual environment is a scene provided when the client of the application program (such as the game application program) runs on the terminal device. The virtual environment refers to the scene created for the virtual object to perform activities (such as the game competition), such as a virtual house, a virtual island, a virtual map and a virtual building, etc. The virtual environment may be a simulation environment of the real world, a semi-simulation and semi-fictional environment, or a purely fictional environment. The virtual environment may be a two-dimensional virtual environment, a 2.5-dimensional virtual environment, or a three-dimensional virtual environment, which is not limited by the embodiments of the present disclosure.

The aforementioned virtual object may be a virtual character controlled by a user account in the application program, or a virtual character controlled by a computer program in the application program. Taking the application program being a game application program as an example, the virtual object may be a game character controlled by a user account in the game application program, or a game monster controlled by a computer program in the game application program. The virtual object may be in the form of a personage, an animal, a cartoon or other forms, which is not limited in the embodiments of the present disclosure. The virtual object may be displayed in a three-dimensional form or in a two-dimensional form, which is not limited in the embodiments of the present disclosure. Optionally, when the virtual environment is a three-dimensional virtual environment, the virtual object is a three-dimensional model created based on animation skeleton technology. Each virtual character has its own shape and volume in the three-dimensional virtual environment, and occupies part of space in the three-dimensional virtual environment.

A display screen of the virtual environment refers to the screen corresponding to the virtual environment presented to the user in the graphical user interface. The display screen of the virtual environment may be a screen obtained by a virtual camera from the virtual environment. In one implementation manner, the virtual camera may obtain a screen of the virtual environment from a third view of the target virtual object controlled by the user. Optionally, the virtual camera is set obliquely above the target virtual object, and the application program observes the virtual environment through the virtual camera with the target virtual object as the center, and obtains a display screen of the virtual environment with the target virtual object as the center. In another implementation manner, the virtual camera obtains the display screen of the virtual environment from the first view of the target virtual object. Optionally, the virtual camera is set directly in front of the target virtual object, and the application program observes the virtual environment from the view of the target virtual object through the virtual camera, and obtains a display screen of the virtual environment with the target virtual object as the first view. In other possible implementation manners, the placement position of the virtual camera is adjustable in real time.

In the embodiments of the present disclosure, the aforementioned display screen of the virtual environment is a display screen for displaying the virtual environment provided by a shooting application, including a map area for displaying a map of the virtual environment. The shooting application refers to an application that provides a virtual gun or bow and arrow for the target virtual object controlled by the user to shoot, such as a third-personal shooting game, a first-personal shooting game, and a multiplayer gun battle survival game, etc.

The method may specifically include the following steps.

In step 101, after a virtual character corresponding to a terminal device is eliminated, a game watching screen identical to a target game screen of a target virtual character being watched is displayed in the graphical user interface of the terminal device.

In step 102, the game watching screen is adjusted in response to an adjustment operation on a viewing angle of the game watching screen.

In step 103, the game watching screen is restored to be consistent with the target game screen of the target virtual character in response to a disappearance of the adjustment operation on the viewing angle.

In the embodiments of the present disclosure, after a virtual character corresponding to the terminal device is eliminated, a game watching screen identical to a target game screen of a target virtual character being watched is displayed in the graphical user interface of the terminal device; the game watching screen is adjusted in response to an adjustment operation on a viewing angle of the game watching screen; and the game watching screen is restored to be consistent with the target game screen of the target virtual character in response to a disappearance of the adjustment operation on the viewing angle. It is realized that the user can adjust the viewing angle of the game watching screen through the adjustment operation on the viewing angle in the process of watching the game, and can restore the game watching screen to the same screen as the user being watched through ending the adjustment operation on the viewing angle, which improves the interest of the process of watching the game. When the user is watching the game screen of his/her teammate, since the user may obtain information that is not noticed by the teammate being watched during the process of adjusting the viewing angle of the watching screen, it can promote strategic communication with the teammate and provide the teammate with powerful combat guidance, and improve sense of participation of the user whose character is eliminated in the entire team combat process.

In the following, the method for watching the game after the character is eliminated in this exemplary embodiment will be further described.

In step 101, a game watching screen identical to a target game screen of a target virtual character being watched is displayed in the graphical user interface of the terminal device after a virtual character corresponding to the terminal device is eliminated.

The user may log in a user account on the terminal device, and the virtual character controlled by the user account in the game application program is the virtual character corresponding to the terminal device.

The elimination of the virtual character refers to the elimination of the virtual character in the game battle, which can be determined by detecting whether the life value of the virtual character is lower than/equal to a preset life value. If so, it is determined that the virtual character is eliminated. The preset life value is usually represented by 0. Generally, when the virtual character corresponding to the terminal device is eliminated, the virtual character will disappear from the game environment of the current game. Correspondingly, since the game screen displayed on the graphical user interface of the terminal device may be captured by a virtual camera corresponding to the virtual character, the game screen displayed on the terminal device loses its meaning when the virtual character is eliminated. At this time, when the user wants to continue participating in the current game, he/she may do so by watching the game.

After determining a target virtual character to be viewed by the user, a game watching screen identical to a target game screen of the target virtual character being watched is displayed in the graphical user interface of the terminal device. It can be understood that the game watching screen and the target game screen of the target virtual character present the same game scene.

In the game of team combat, the target virtual character is a currently surviving virtual character that belongs to a same game side as the virtual character corresponding to the terminal device. That is, in the game of team combat, the user who controls the character being eliminated may watch the game screen of his/her teammate(s).

The process of determining the target virtual character to be viewed may be as follows: after the virtual character is eliminated, an exit game control and a game watching mode control are displayed on the terminal device for the user to select; when the user selects the game watching mode control, optional virtual characters may be displayed on the terminal device, so that the user may select one of the optional virtual characters as the target virtual character to be watched. The optional virtual character refers to a surviving virtual character in the current game. Optionally, the optional virtual character may also refer to other virtual character(s) surviving in the current game and belonging to the same game side as the eliminated virtual character. Alternatively, the process of determining the target virtual character to be watched may be as follows: after the virtual character is eliminated, an exit game control and a game watching mode control are displayed on the terminal device for the user to select; when the user selects the game watching mode control, the target virtual character to be watched is determined according to a preset rule, for example, the virtual character with the most/least eliminating objects among the optional virtual characters is determined as the target virtual character to be watched; for another example, the virtual character with the highest/lowest level among the optional virtual characters is determined as the target virtual character to be watched, and so on, which is not limited in the embodiments of the present disclosure.

The above process of displaying the game watching screen identical to the target game screen of the target virtual character being watched in the graphical user interface of the terminal device may specifically include:

- generating, in the terminal device, a game watching camera corresponding to a target camera that captures the target game screen; where a position of the game watching camera is the same as a position of the target camera, and an orientation of the game watching camera is the same as an orientation of the target camera; and
- displaying, in the terminal device, the game watching screen captured by the game watching camera.

In the embodiment of the present disclosure, in the game watching mode, the position and orientation information of the target virtual camera corresponding to the target virtual character being watched may be obtained, and then a game watching camera with the same position and orientation information as the target virtual camera may be generated in the game environment of the terminal device, and the game watching screen may be obtained by capturing the game environment through the game watching camera, and the game watching screen may be displayed in a graphical user interface of the terminal device. At this time, the game watching screen is consistent with the target game screen being watched. The position of the game watching camera is consistent with the position of the target camera in real time, and the orientation of the game watching camera is also consistent with the orientation of the target camera by default. Therefore, the effect of watching the target virtual character is realized.

In step 102, the game watching screen is adjusted in response to an adjustment operation on a viewing angle of the game watching screen.

In the embodiments of the present disclosure, the viewing angle adjustment function for the game watching screen is provided to the terminal device executing the game watching mode, and the user who is watching the game may adjust the game watching screen by triggering the adjustment operation on the viewing angle of the game watching screen displayed by the terminal device to obtain the surrounding environment in which the target virtual character being watched is located, thereby improving the interest of watching the game.

Specifically, the adjusting the game watching screen in response to the adjustment operation on the viewing angle of the game watching screen, includes:

controlling the orientation of the game watching camera to adjust the game watching screen in response to the adjustment operation on the viewing angle of the game watching screen.

In this embodiment, when an angle adjustment operation on the game watching screen is detected, the orientation of the watching camera is controlled to adjust the game watching screen. When the orientation of the game watching camera changes, the game watching screen captured by the game watching camera will also change, and this change will not affect the target game screen being watched. That is, it will not affect the control of the target virtual character by the user corresponding to the target virtual character.

It should be noted that the position of the game watching camera is always consistent with the position of the target camera, and the position of the target camera is controlled by the user being watched. That is to say, during the process of adjusting the orientation of the game watching camera, when the position of the target camera moves, the position of the game watching camera will move synchronously.

Optionally, the adjustment operation on the viewing angle is a sliding operation, and the above controlling the orientation of the game watching camera to adjust the game watching screen in response to the adjustment operation on the viewing angle of the game watching screen, includes:

in response to a sliding operation of an operating medium on the game watching screen, controlling the orientation of the game watching camera to move following the sliding operation to adjust the game watching screen.

In this embodiment, the user may perform a sliding operation in an area of the game watching screen displayed on the graphical user interface of the terminal device through an operating medium to adjust the game watching screen. The operating medium may be a limb of the user, such as a finger, or other touching objects, such as a stylus. The sliding operation refers to an operation of moving the operation medium from one position of the game watching screen to another without leaving the screen. When a sliding operation acting on the game watching screen is detected, the orientation of the game watching camera is controlled to follow the sliding operation to adjust the game watching screen.

Optionally, the initial orientation of the game watching camera may be the orientation when the sliding operation is triggered; that is, during the execution of the sliding operation, the orientation of the game watching camera is not affected by the orientation of the target camera.

Exemplarily, when the sliding operation is a left-right sliding operation, the game watching camera is rotated left and right accordingly; when the sliding operation is an up-down sliding operation, the game watching camera is rotated up and down accordingly. The viewing camera shoots in real time during the rotation and obtains the corresponding display screen, which is the game watching screen after adjustment.

Optionally, the adjustment operation on the viewing angle is a click operation, and a preset point is displayed in the game watching screen, the above controlling the orientation of the game watching camera to adjust the game watching screen in response to the adjustment operation on the viewing angle of the game watching screen, includes:

in response to the click operation of the operating medium on the game watching screen, controlling the orientation of the game watching camera to change according to the direction between the preset point and the clicking position of the click operation, so as to adjust the game watching screen.

In this embodiment, the target orientation of the game watching camera is determined based on a positional relationship between the preset point and the clicking position, and the game watching camera is adjusted to the target orientation.

In step 103, the game watching screen is restored to be consistent with the target game screen of the target virtual character in response to a disappearance of the adjustment operation on the viewing angle.

In this embodiment, when the adjustment operation on the viewing angle disappears, the game watching screen displayed on the terminal device is restored to be consistent with the target game screen of the target virtual character. It can be understood that, in the embodiments of the present application, in the case that no operation is performed, the game watching screen is consistent with the target game screen.

The disappearance of the adjustment operation on the viewing angle refers to that the operating medium triggering the adjustment operation on the viewing angle leaves the terminal device and is no longer in contact with the screen of the terminal device. Therefore, the above restoring the game watching screen to be consistent with the target game screen of the target virtual character in response to a disappearance of the adjustment operation on the viewing angle, specifically includes:

in response to the operating medium leaving the game watching screen, restoring the game watching screen to be consistent with the target game screen of the target virtual character.

In this embodiment, when the operating medium triggering the adjustment operation on the viewing angle leaves the game watching screen, the position and orientation of the game watching camera are the same as those of the target camera respectively, and the game watching screen returns to be consistent with the target game screen of the target virtual character, which facilitates the user to continue to watch the game.

When the user finds information about enemies, vehicles, props, buildings or bunkers, etc. during adjustment of the game watching screen, the user being watched may not be aware of the found information since the found information is realized based on the user's adjustment to the game watching screen, the user may restore the game watching screen to be consistent with the target game screen by ending the adjustment operation on the viewing angle, so as to better describe the aforementioned found information to the user being watched.

Exemplarily, the user finds a vehicle (assuming that the vehicle is stationary) when rotating the game watching camera from direct front to direct left, and finds the enemy (assuming that the enemy is stationary for a period of time)

when continuing to rotate to the direct rear. When the user ends the adjustment operation on the viewing angle, the game watching screen is restored to be consistent with the target game screen. At this time, if the aforementioned found vehicle is displayed on the game watching screen, it may be understood that when the aforementioned found vehicle is directly in front of the game watching camera, the corresponding situation is as follows: in the process of adjusting the game watching screen by the user, the target camera is adjusted from the original direct front to the original direct left, therefore, the current direct front is the original direct left, and it can be determined that there is an enemy in the direction of the direct left of the target virtual character at this time. The user may indicate to the user being watched via voice or text that there is an enemy on the left of the target virtual character, so that the user being watched can perform a corresponding strategic measure according to the information. Thus, it can further promote the communication between the user and the user being watched, improve teamwork and the social atmosphere of the game, and improve the value of the game watching of the user and the experience of the game watching.

Further, in an optional implementation manner of the present disclosure, the above method further includes:

in response to a marking operation on a map area of the game watching screen, displaying marked information corresponding to the marking operation on the map area; and synchronizing the marked information to the target game screen, so that the marked information is displayed in a target map area in the target game screen.

The marking operation includes an operation of marking a marked point and/or an operation of marking a marked route, and correspondingly, the marked information includes a marked point and/or a marked route.

In this embodiment, by receiving the marking operation on the map area in the game watching screen, the corresponding marked information is displayed in the map area of the game watching screen, and the marked information is synchronously displayed in the target map area of the target game screen. It provides convenience for the communication between the user who is watching the game and the user who is being watched, improves the accuracy of communication information, and improves the efficiency of the communication.

Exemplarily, when the user finds information such as enemies, vehicles, props, buildings, or bunkers during the process of adjusting the game watching screen, the information can be marked in the map area, and synchronously displayed in the target map area corresponding to the target game screen of the user being watched, which can improve the interaction between the user who is watching the game and the current game, promote teamwork, and improve the game experience.

Optionally, the map area may be presented in a small window display mode in the game watching screen. When the user needs to mark in the map area, for improving the accuracy, the map area may be enlarged by a preset operation, and then the relevant marking operation may be performed in the enlarged map area.

Optionally, the displaying marked information corresponding to the marking operation on the map area in response to the marking operation on the map area of the game watching screen, specifically includes:

realizing the switch between a point-marking mode and a line-marking mode through a mode switching control displayed in the map area;

in the point-marking mode, generating a marked point corresponding to a click operation in response to the click operation on the map area;

in the line-marking mode, in response to a click operation on the map area, generating a route marked point corresponding to the click operation, and connecting the route marked point with a next generated route marked point to generate a marked route; and displaying the marked point and/or the marked route in the map area.

In this embodiment, during the process of marking in the map area, the user may determine the current marking mode through the mode switching control. In the point-marking mode, clicking the map area may realize marking a marked point in the map area and displaying the marked point in the map area. In the line-marking mode, clicking the map area may automatically connect the positions of two adjacent clicking operations to generate a marked route, and display the marked route in the map area.

Optionally, the displaying the corresponding marked information on the map area in response to the marking operation on the map area of the game watching screen, specifically includes:

in response to a click operation on the map area, triggering a point-marking mode and generating a marked point corresponding to the click operation; and/or, in response to a long press operation on a first marked point in the map area, triggering a line-marking mode and determining the first marked point as a starting point of a route to be drawn;

in response to a continuous sliding operation continuous with the long press operation, determining an end point of the continuous sliding operation as a second marked point and generating a marked route connecting the first marked point and the second marked point; and displaying the marked point and/or the marked route in the map area.

In this embodiment, during the process of marking in the map area, the point-marking mode is triggered by a click operation to realize marking the marked point in the map area and displaying the marked point in the map area. The line-marking mode is triggered by a long press operation on the marked point, and the continuous sliding operation is continuously performed, so that a corresponding marked route may be generated and displayed in the map area. It can be realized that a corresponding marking mode can be activated according to the operation performed on the map area without the need of configuring the mode switching control, which can reduce the burden of the interface content. At the same time, it can also prevent wrong marking caused by selecting the wrong mode switching control, which improves the convenience of the user's operation.

The continuous sliding operation continuous with the long press operation refers to that the finger does not leave the screen when triggering the long press operation and the continuous sliding operation. The continuous sliding operation refers to an operation in which a finger continuously moves from one position on the screen to another without leaving the screen. The continuous movement refers to that the time spent at any position during the movement does not exceed a reference time. When the finger leaves the screen after moving continuously from one position to another on the screen without leaving the screen, the position point at which the finger leaves the screen is determined as the end point of the sliding operation. When the finger continuously moves from one position on the screen to another without leaving the screen, and stays at the other position for more than the reference time, the other position is determined as the end point of the sliding operation. The first marked point may be any of the marked points shown in the map area, including an independent marked point that was generated earlier, and an endpoint marked point of the original marked route that was generated earlier.

When the first marked point is the endpoint marked point of the original marked route that was generated earlier, the generated marked route is merged with the original marked route to obtain a target marked route, and the target marked route is used as the original marked route for a next marked route when generating the next marked route. A target marked route including a plurality of marked routes may be obtained by repeatedly performing the long press operation and the successive continuous sliding operation.

Further, in an optional implementation manner of the present disclosure, the above method further includes:

synchronizing the marked information to a game screen corresponding to other virtual character belonging to the same game side as the virtual character.

In this embodiment, after the user who is watching the game performs a marking operation in the map area of the game watching screen, the marked information displayed in the map area of the game watching screen may also be synchronously displayed on the game screens corresponding to all virtual characters of the same game side, so that the information may be shared with other teammates.

In the embodiments of the present disclosure, a game watching screen identical to a target game screen of a target virtual character being watched is displayed in the graphical user interface of the terminal device after a virtual character corresponding to the terminal device is eliminated; the game watching screen is adjusted in response to an adjustment operation on a viewing angle of the game watching screen; and the game watching screen is restored to be consistent with the target game screen of the target virtual character in response to a disappearance of the adjustment operation on the viewing angle; it is realized that in the process of watching the game, the user can adjust the viewing angle of the game watching screen through the adjustment operation on the viewing angle, and can restore the game watching screen to the same screen as the user being watched by ending the adjustment operation on the viewing angle, which improves the interest of the process of watching the game. When the user is watching the game screen of his/her teammate, since the user may obtain information that is not noticed by the teammate being watched during the process of adjusting the viewing angle of the watching screen, the strategic communication with the teammate can be promoted, the teammate can be provided with powerful combat guidance, communication between the user whose character is eliminated and the user whose character is surviving can be facilitated, teamwork and the social atmosphere of the game can be improved, and sense of participation of the user whose character is eliminated can be improved in the entire team combat process.

It should be noted that, for the method embodiments, they are expressed as a series of action combinations for the sake of simple description. However, a person skilled in the art should know that the embodiments of the present disclosure are not limited by the described order of the actions, because certain steps may be carried out in other orders or simultaneously according to the embodiments of the present disclosure. Secondly, a person skilled in the art should also know that the embodiments described in the specification all belong to preferred embodiments, and the actions involved are not necessarily required by the embodiments of the present disclosure.

Figure 2:
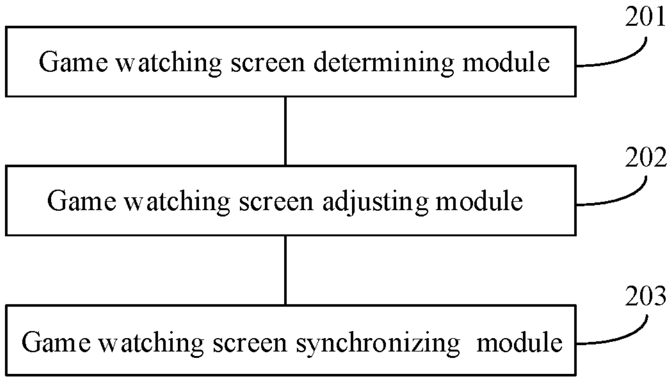
FIG. 2 is a structural block diagram of an apparatus for watching a game after a character is eliminated in one of the embodiments of the present disclosure.

Referring to FIG. 2, a structural block diagram of an apparatus for watching a game after a character is eliminated provided by an embodiment of the present disclosure is shown, and a graphical user interface is obtained by executing an application program on a processor of a terminal device and rendering on a touch display screen of the terminal device. The apparatus may specifically include the following modules:

a game watching screen determining module 201, configured to display, in the graphical user interface of the terminal device, a game watching screen identical to a target game screen of a target virtual character being watched, after a virtual character corresponding to the terminal device is eliminated;

a game watching screen adjusting module 202, configured to adjust the game watching screen in response to an adjustment operation on a viewing angle of the game watching screen; and a game watching screen synchronizing module 203, configured to restore the game watching screen to be consistent with the target game screen of the target virtual character in response to a disappearance of the adjustment operation on the viewing angle.

In an embodiment of the present disclosure, the game watching screen determining module 201 includes:

a camera generating module, configured to generate, in the terminal device, a game watching camera corresponding to a target camera that captures the target game screen; where a position of the game watching camera is the same as a position of the target camera, and an orientation of the game watching camera is the same as an orientation of the target camera; and a captured screen displaying module, configured to display the game watching screen captured by the game watching camera.

In an embodiment of the present disclosure, the game watching screen adjusting module 202 includes:

a camera orientation adjusting module, configured to control the orientation of the game watching camera to adjust the game watching screen in response to the adjustment operation on the viewing angle of the game watching screen.

In an embodiment of the present disclosure, the camera orientation adjusting module is specifically configured to:

in response to a sliding operation of an operating medium on the game watching screen, control the orientation of the game watching camera to move following the sliding operation to adjust the game watching screen.

In an embodiment of the present disclosure, the game watching screen synchronizing module 203 is specifically configured to:

in response to the operating medium leaving the game watching screen, restore the game watching screen to be consistent with the target game screen of the target virtual character.

In an embodiment of the present disclosure, the target virtual character is a currently surviving virtual character that belongs to a same game side as the virtual character corresponding to the terminal device.

In an embodiment of the present disclosure, the apparatus further includes:

a mark determining module, configured to, in response to a marking operation on a map area of the game watching screen, display marked information corresponding to the marking operation on the map area; and a first mark synchronizing module, configured to synchronize the marked information to the target game screen, so that the marked information is displayed in a target map area in the target game screen.

In an embodiment of the present disclosure, the apparatus further includes:

a second mark synchronizing module, configured to synchronize the marked information to a game screen corresponding to other virtual character belonging to the same game side as the virtual character.

In an embodiment of the present disclosure, the mark determining module includes:

a first response module, configured to, in response to a click operation on the map area, trigger a point-marking mode and generate a marked point corresponding to the click operation; and/or a second response module, configured to, in response to a long press operation on a first marked point in the map area, trigger a line-marking mode and determine the first marked point as a starting point of a route to be drawn;

a third response module, configured to, in response to a continuous sliding operation continuous with the long press operation, determine an end point of the continuous sliding operation as a second marked point and generate a marked route connecting the first marked point and the second marked point; and a mark displaying module, configured to display the marked point and/or the marked route in the map area.

In the embodiments of the present disclosure, a game watching screen identical to a target game screen of a target virtual character being watched is displayed in the graphical user interface of the terminal device after a virtual character corresponding to the terminal device is eliminated; the game watching screen is adjusted in response to an adjustment operation on a viewing angle of the game watching screen; and the game watching screen is restored to be consistent with the target game screen of the target virtual character in response to a disappearance of the adjustment operation on the viewing angle; it is realized that the user may adjust the viewing angle of the game watching screen through the adjustment operation on the viewing angle in the process of watching the game, and the game watching screen may be restored to the same screen as the user being watched, which improves the interest of the process of watching the game. When the user is watching the game screen of his/her teammate, since the user may obtain information that is not known by the teammate being watched during the process of adjusting the viewing angle of the watching screen, the strategic communication with the teammate can be promoted, the teammate can be provided with powerful combat guidance, communication between the user whose character is eliminated and the user whose character is surviving can be facilitated, teamwork and the social atmosphere of the game can be improved, and sense of participation of the user whose character is eliminated can be improved in the entire team combat process.

For the apparatus embodiments, since they are basically similar to the method embodiments, the description is relatively simple, and for the related parts, it is sufficient to refer to the corresponding part of the description of the method embodiments.

Figure 3:
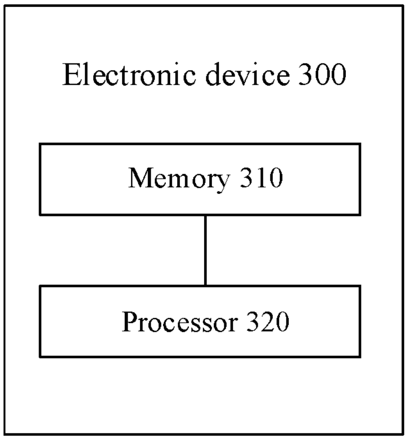
FIG. 3 is a structural block diagram of an electronic device in one of the embodiments of the present disclosure.
Figure 4:
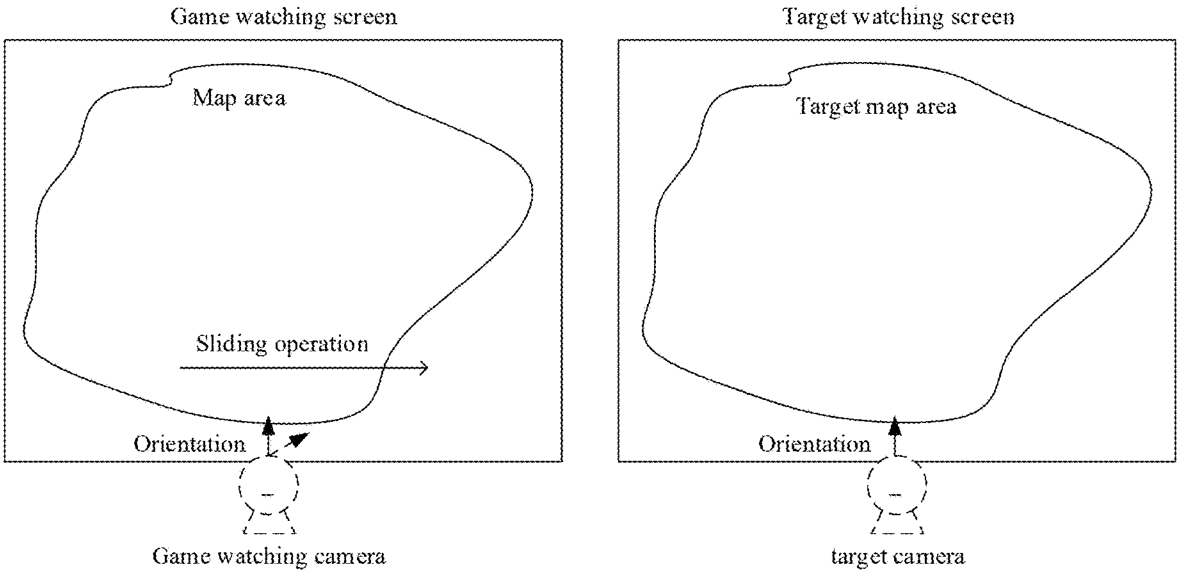
FIG. 4 is a schematic diagram of a game watching screen and a target watching screen according to an embodiment of the present disclosure.
Figure 5:
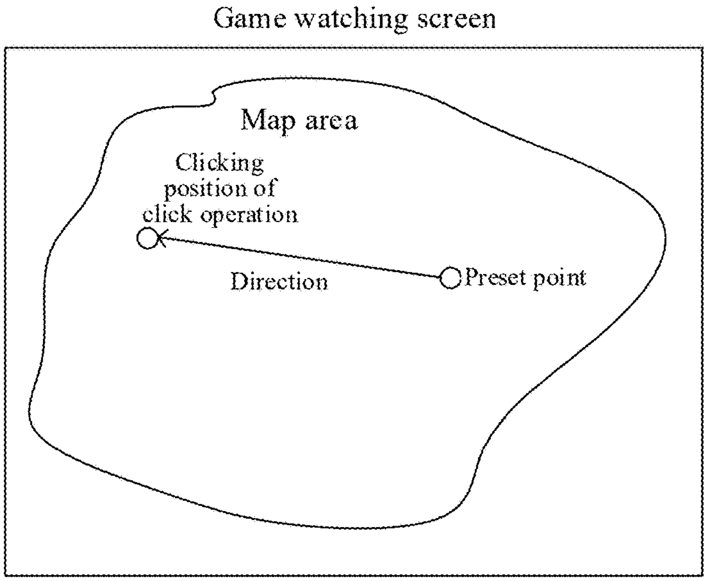
FIG. 5 is a schematic diagram of a direction between a preset point and a clicking position of a click operation according to an embodiment of the present disclosure.
Figure 6:
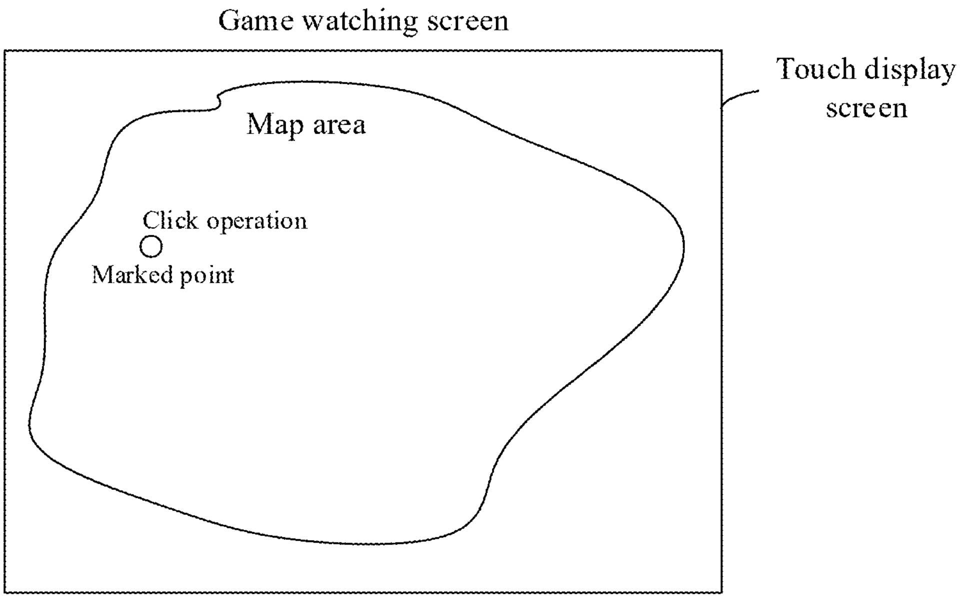
FIG. 6 is a schematic diagram of a point-marking mode according to an embodiment of the present disclosure.
Figure 7:
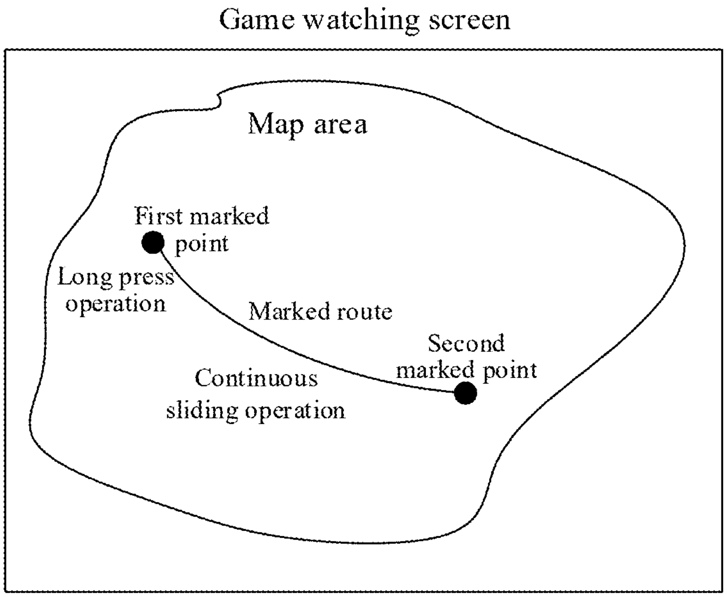
FIG. 7 is a schematic diagram of a line-marking mode according to an embodiment of the present disclosure.
Figure 8:
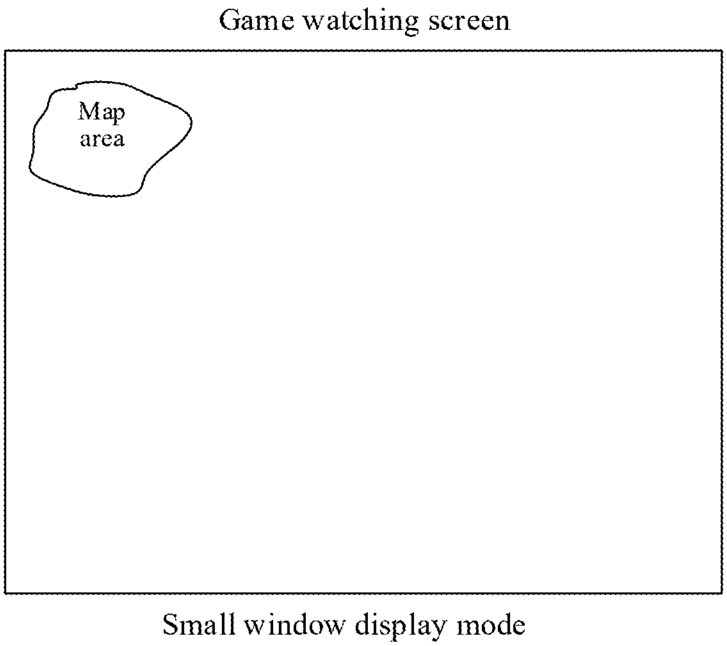
FIG. 8 is a schematic diagram of presenting the map area in a small window display mode in the game watching screen according to an embodiment of the present disclosure.

The embodiments of the present disclosure further disclose an electronic device 300 as shown in FIG. 3, including a processor 310, a memory 320, and a computer program stored on the memory and capable of running on the processor, where the computer program, when executed by the processor, implements the steps of the above method for watching a game after a character is eliminated, for example:

displaying, in the graphical user interface of the terminal device, a game watching screen identical to a target game screen of a target virtual character being watched, after a virtual character corresponding to the terminal device is eliminated;

adjusting the game watching screen in response to an adjustment operation on a viewing angle of the game watching screen; and restoring the game watching screen to be consistent with the target game screen of the target virtual character in response to a disappearance of the adjustment operation on the viewing angle.

Optionally, the displaying, in the graphical user interface of the terminal device, the game watching screen identical to the target game screen of the target virtual character being watched, after the virtual character corresponding to the terminal device is eliminated, includes:

generating, in the terminal device, a game watching camera corresponding to a target camera that captures the target game screen; where a position of the game watching camera is the same as a position of the target camera, and an orientation of the game watching camera is the same as an orientation of the target camera; and displaying, in the terminal device, the game watching screen captured by the game watching camera.

Optionally, the adjusting the game watching screen in response to the adjustment operation on the viewing angle of the game watching screen, includes:

controlling the orientation of the game watching camera to adjust the game watching screen in response to the adjustment operation on the viewing angle of the game watching screen.

Optionally, the controlling the orientation of the game watching camera to adjust the game watching screen in response to the adjustment operation on the viewing angle of the game watching screen, includes:

in response to a sliding operation of an operating medium on the game watching screen, controlling the orientation of the game watching camera to move following the sliding operation to adjust the game watching screen.

Optionally, the restoring the game watching screen to be consistent with the target game screen of the target virtual character in response to a disappearance of the adjustment operation on the viewing angle, includes:

in response to the operating medium leaving the game watching screen, restoring the game watching screen to be consistent with the target game screen of the target virtual character.

Optionally, the target virtual character is a currently surviving virtual character that belongs to a same game side as the virtual character corresponding to the terminal device.

Optionally, the method further includes:

in response to a marking operation on a map area of the game watching screen, displaying marked information corresponding to the marking operation on the map area; and synchronizing the marked information to the target game screen, so that the marked information is displayed in a target map area in the target game screen.

Optionally, the method further includes:

synchronizing the marked information to game screens corresponding to other virtual characters belonging to the same game side as the virtual character.

Optionally, the displaying the corresponding marked information on the map area in response to the marking operation on the map area of the game watching screen, includes:

in response to a click operation on the map area, triggering a point-marking mode and generating a marked point corresponding to the click operation; and/or, in response to a long press operation on a first marked point in the map area, triggering a line-marking mode and determining the first marked point as a starting point of a route to be drawn;

in response to a continuous sliding operation continuous with the long press operation, determining an end point of the continuous sliding operation as a second marked point and generating a marked route connecting the first marked point and the second marked point; and displaying the marked point and/or the marked route in the map area.

Through this manner, a game watching screen identical to a target game screen of a target virtual character being watched is displayed in the graphical user interface of the terminal device after a virtual character corresponding to the terminal device is eliminated; the game watching screen is adjusted in response to an adjustment operation on a viewing angle of the game watching screen; and the game watching screen is restored to be consistent with the target game screen of the target virtual character in response to a disappearance of the adjustment operation on the viewing angle; it is realized that in the process of watching the game, the user can adjust the viewing angle of the game watching screen through the adjustment operation on the viewing angle, and can restore the game watching screen to the same screen as the user being watched by ending the adjustment operation on the viewing angle, which improves the interest of the process of watching the game. When the user is watching the game screen of his teammate, since the user may obtain information that is not noticed by the teammate being watched during the process of adjusting the viewing angle of the watching screen, it can promote strategic communication with the teammate and provide the teammate with powerful combat guidance, and sense of participation of the user whose character is eliminated can be improved in the entire team combat process.

The embodiments of the present disclosure further disclose a computer-readable storage medium, where a computer program is stored on the computer-readable storage medium, and the computer program, when executed by a processor, implements the steps of the above method for watching a game after a character is eliminated, for example:

displaying, in the graphical user interface of the terminal device, a game watching screen identical to a target game screen of a target virtual character being watched, after a virtual character corresponding to the terminal device is eliminated;

adjusting the game watching screen in response to an adjustment operation on a viewing angle of the game watching screen; and restoring the game watching screen to be consistent with the target game screen of the target virtual character in response to a disappearance of the adjustment operation on the viewing angle.

Optionally, the displaying, in the graphical user interface of the terminal device, the game watching screen identical to the target game screen of the target virtual character being watched, after the virtual character corresponding to the terminal device is eliminated, includes:

generating, in the terminal device, a game watching camera corresponding to a target camera that captures the target game screen; where a position of the game watching camera is the same as a position of the target camera, and an orientation of the game watching camera is the same as an orientation of the target camera; and displaying, in the terminal device, the game watching screen captured by the game watching camera.

Optionally, the adjusting the game watching screen in response to the adjustment operation on the viewing angle of the game watching screen, includes:

controlling the orientation of the game watching camera to adjust the game watching screen in response to the adjustment operation on the viewing angle of the game watching screen.

Optionally, the controlling the orientation of the game watching camera to adjust the game watching screen in response to the adjustment operation on the viewing angle of the game watching screen, includes:

in response to a sliding operation of an operating medium on the game watching screen, controlling the orientation of the game watching camera to move following the sliding operation to adjust the game watching screen.

Optionally, the restoring the game watching screen to be consistent with the target game screen of the target virtual character in response to a disappearance of the adjustment operation on the viewing angle, includes:

in response to the operating medium leaving the game watching screen, restoring the game watching screen to be consistent with the target game screen of the target virtual character.

Optionally, the target virtual character is a currently surviving virtual character that belongs to a same game side as the virtual character corresponding to the terminal device.

Optionally, the method further includes:

in response to a marking operation on a map area of the game watching screen, displaying marked information corresponding to the marking operation on the map area; and synchronizing the marked information to the target game screen, so that the marked information is displayed in a target map area in the target game screen.

Optionally, the method further includes:

synchronizing the marked information to game screens corresponding to other virtual characters belonging to the same game side as the virtual character.

Optionally, the displaying the corresponding marked information on the map area in response to the marking operation on the map area of the game watching screen, includes:

in response to a click operation on the map area, triggering a point-marking mode and generating a marked point corresponding to the click operation; and/or, in response to a long press operation on a first marked point in the map area, triggering a line-marking mode and determining the first marked point as a starting point of a route to be drawn;

in response to a continuous sliding operation continuous with the long press operation, determining an end point of the continuous sliding operation as a second marked point and generating a marked route connecting the first marked point and the second marked point; and displaying the marked point and/or the marked route in the map area.

Through this manner, a game watching screen identical to a target game screen of a target virtual character being watched is displayed in the graphical user interface of the terminal device after a virtual character corresponding to the terminal device is eliminated; the game watching screen is adjusted in response to an adjustment operation on a viewing angle of the game watching screen; and the game watching screen is restored to be consistent with the target game screen of the target virtual character in response to a disappearance of the adjustment operation on the viewing angle; it is realized that in the process of watching the game, the user can adjust the viewing angle of the game watching screen through the adjustment operation on the viewing angle, and can restore the game watching screen to the same screen as the user being watched, which improves the interest of the process of watching the game. When the user is watching the game screen of his/her teammate, since the user may obtain information that is not noticed by the teammate being watched during the process of adjusting the viewing angle of the watching screen, it can promote strategic communication with the teammate and provide the teammate with powerful combat guidance, and sense of participation of the user whose character is eliminated can be improved in the entire team combat process.

The various embodiments in this specification are described in a progressive manner, and each embodiment focuses on the differences from other embodiments, and the same or similar parts of each embodiment may be referred to each other.

A person skilled in the art should understand that the embodiments of the present disclosure may be provided as methods, apparatuses, or computer program products. Accordingly, the embodiments of the present disclosure may take the form of fully hardware embodiments, fully software embodiments, or embodiments combining software and hardware aspects. Further, the embodiments of the present disclosure may take the form of a computer program product implemented on one or more computer-usable storage media (including, but not limited to, a disk memory, a CD-ROM, an optical memory, etc.) containing computer-usable program code therein.

The embodiments of the present disclosure are described with reference to the flowcharts and/or block diagrams of methods, terminal devices (systems), and computer program products according to the embodiments of the present disclosure. It should be understood that each procedure and/or block in the flowchart and/or block diagram, and a combination of procedures and/or blocks in the flowchart and/or block diagram may be realized by computer program instructions. These computer program instructions may be provided to a general purpose computer, a special purpose computer, an embedded processor, or a processor of other programmable data processing terminal device to produce a machine such that instructions executed by the computer or the processor of other programmable data processing terminal device produce an apparatus for implementing the functions specified in one or more procedures of the flowchart and/or one or more blocks of the block diagram.

These computer program instructions may also be stored in a computer-readable memory capable of directing a computer or other programmable data processing terminals to operate in a specific manner, such that the instructions stored in the computer-readable memory produce a product containing an instruction apparatus that implements the functions specified in one or more procedures of the flowchart and/or one or more blocks of the block diagram.

These computer program instructions may also be loaded into a computer or other programmable data processing terminal devices, so that a series of operational steps are performed on the computer or other programmable terminal devices to generate computer-implemented processing, such that the instructions performed on the computer or other programmable terminal devices provide the steps for implementing the functions specified in one or more procedures of the flowchart and/or one or more blocks of the block diagram.

Although preferred embodiments of the embodiments of the present disclosure have been described, additional changes and modifications to these embodiments may be made by those skilled in the art once the basic inventive concept is appreciated. Therefore, the appended claims are intended to be construed to include the preferred embodiments as well as all changes and modifications which fall within the scope of the embodiments of the present disclosure.

Finally, it should also be noted that in this text, relationship terms such as first and second are used only to distinguish one entity or operation from another entity or operation, and do not necessarily require or imply the existence of any such actual relationship or order between these entities or operations. Furthermore, the terms “including”, “containing”, or any other variant thereof, are intended to cover non-exclusive inclusion, so that a process, method, object or terminal device including a series of elements includes not only those elements but also other elements that are not explicitly listed, or also includes the elements inherent to such process, method, object or terminal device. Without further limitations, an element defined by the phrase “including a . . . ” does not exclude the presence of additional identical element in the process, method, object or terminal device including this element.

The method and apparatus for watching a game after a character is eliminated, the electronic device, and the storage medium provided in the present disclosure are described in detail above. Specific examples are applied herein to illustrate the principles and implementation manners of the present disclosure, and the above illustrations of embodiments are only used for helping understand the methods of the present disclosure and core ideas thereof. At the same time, for those of ordinary skill in the art, there will be changes in the specific implementation manners and the scope of application according to the idea of the present disclosure. In summary, the contents of the specification should not be construed as a limitation of the present disclosure.

What is claimed is:

1. A method for watching a game after a character is eliminated, wherein the method comprises:

in response to a virtual character corresponding to a terminal device being eliminated in the game, displaying, by the terminal device, in a graphical user interface of the terminal device, a game watching screen identical to a target game screen of a target virtual character being watched;

adjusting, by the terminal device, the game watching screen in response to an adjustment operation on a viewing angle of the game watching screen; and restoring, by the terminal device, the game watching screen to be consistent with the target game screen of the target virtual character in response to a disappearance of the adjustment operation on the viewing angle.

2. The method according to claim 1, wherein the displaying comprises:

generating, in the terminal device, a game watching camera corresponding to a target camera that captures the target game screen; wherein a position of the game watching camera is the same as a position of the target camera, and an orientation of the game watching camera is the same as an orientation of the target camera; and displaying, in the terminal device, the game watching screen captured by the game watching camera.

3. The method according to claim 2, wherein the adjusting comprises:

controlling the orientation of the game watching camera to adjust the game watching screen in response to the adjustment operation on the viewing angle of the game watching screen.

4. The method according to claim 3, wherein the controlling comprises:

in response to a sliding operation of an operating medium on the game watching screen, controlling the orientation of the game watching camera to move following the sliding operation to adjust the game watching screen.

5. The method according to claim 3, wherein the controlling comprises:

in response to a click operation of an operating medium on the game watching screen, controlling the orientation of the game watching camera to change according to a direction between a preset point displayed in the game watching screen and a clicking position of the click operation, so as to adjust the game watching screen.

6. The method according to claim 4, wherein the restoring comprises:

in response to the operating medium leaving the game watching screen, restoring the game watching screen to be consistent with the target game screen of the target virtual character.

7. The method according to claim 4, wherein an initial orientation of the game watching camera is an orientation when the sliding operation is triggered.

8. The method according to claim 1, wherein the target virtual character is a currently surviving virtual character that belongs to a same game side as the virtual character corresponding to the terminal device.

9. The method according to claim 8, wherein the method further comprises:

in response to a marking operation on a map area of the game watching screen, displaying marked information corresponding to the marking operation on the map area; and synchronizing the marked information to the target game screen, wherein the marked information is displayed in a target map area in the target game screen.

10. The method according to claim 9, wherein the method further comprises:

synchronizing the marked information to a game screen corresponding to other virtual character belonging to the same game side as the virtual character.

11. The method according to claim 9, wherein displaying the corresponding marked information on the map area in response to the marking operation on the map area of the game watching screen, comprises:

in response to a click operation on the map area, triggering a point-marking mode and generating a marked point corresponding to the click operation; and/or, in response to a long press operation on a first marked point in the map area, triggering a line-marking mode and determining the first marked point as a starting point of a route to be drawn;

in response to a continuous sliding operation continuous with the long press operation, determining an end point of the continuous sliding operation as a second marked point and generating a marked route connecting the first marked point and the second marked point; and displaying the marked point and/or the marked route in the map area.

12. The method according to claim 9, wherein the method further comprises:

presenting the map area in a small window display mode in the game watching screen; and in response to a need of marking in the map area, enlarging the map area by a preset operation, and then performing the marking operation in the enlarged map area.

13. The method according to claim 9, wherein displaying the corresponding marked information on the map area in response to the marking operation on the map area of the game watching screen, comprises:

realizing a switch between a point-marking mode and a line-marking mode through a mode switching control displayed in the map area;

in the point-marking mode, generating a marked point corresponding to a click operation in response to the click operation on the map area;

in the line-marking mode, in response to a click operation on the map area, generating a route marked point corresponding to the click operation, and connecting the route marked point with a next generated route marked point to generate a marked route; and displaying the marked point and/or the marked route in the map area.

14. The method according to claim 1, wherein the graphical user interface is obtained by executing an application program on a processor of the terminal device and rendering on a touch display screen of the terminal device.

15. An electronic device, comprising: a processor, a memory, and a computer program stored on the memory and capable of running on the processor, wherein the computer program, when executed by the processor, implements the steps of:

in response to a virtual character corresponding to the electronic device being eliminated in a game, displaying, in a graphical user interface of the electronic device, a game watching screen identical to a target game screen of a target virtual character being watched;

adjusting the game watching screen in response to an adjustment operation on a viewing angle of the game watching screen; and restoring the game watching screen to be consistent with the target game screen of the target virtual character in response to a disappearance of the adjustment operation on the viewing angle.

16. The electronic device according to claim 15, wherein the processor is further configured to:

generate, in the terminal device, a game watching camera corresponding to a target camera that captures the target game screen; where a position of the game watching camera is the same as a position of the target camera, and an orientation of the game watching camera is the same as an orientation of the target camera; and display the game watching screen captured by the game watching camera.

17. The electronic device according to claim 16, wherein the processor is further configured to:

control the orientation of the game watching camera to adjust the game watching screen in response to the adjustment operation on the viewing angle of the game watching screen.

18. The electronic device according to claim 17, wherein the processor is further configured to:

in response to a sliding operation of an operating medium on the game watching screen, control the orientation of the game watching camera to move following the sliding operation to adjust the game watching screen.

19. The electronic device according to claim 18, wherein the processor is further configured to:

in response to the operating medium leaving the game watching screen, restore the game watching screen to be consistent with the target game screen of the target virtual character.

20. A non-transitory computer-readable storage medium, wherein a computer program is stored on the computer-readable storage medium, and the computer program, when executed by a processor, implements the steps of:

in response to a virtual character corresponding to a terminal device being eliminated in a game, displaying, in a graphical user interface of the terminal device, a game watching screen identical to a target game screen of a target virtual character being watched;

adjusting the game watching screen in response to an adjustment operation on a viewing angle of the game watching screen; and restoring the game watching screen to be consistent with the target game screen of the target virtual character in response to a disappearance of the adjustment operation on the viewing angle.

* * * * *